United States Patent
Zhang (10) Patent No.: US 12,055,990 B2
(45) Date of Patent: Aug. 6, 2024

(54) CONTROL DEVICE FOR CENTRALIZED POWER SUPPLY OF SERVER

(71) Applicant: INSPUR SUZHOU INTELLIGENT TECHNOLOGY CO., LTD., Jiangsu (CN)

(72) Inventor: Songtao Zhang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 115 days.

(21) Appl. No.: 17/789,911

(22) PCT Filed: Jun. 28, 2020

(86) PCT No.: PCT/CN2020/098378
§ 371 (c)(1),
(2) Date: Jun. 29, 2022

(87) PCT Pub. No.: WO2021/159651
PCT Pub. Date: Aug. 19, 2021

(65) Prior Publication Data
US 2023/0072564 A1    Mar. 9, 2023

(30) Foreign Application Priority Data
Feb. 10, 2020 (CN) .......................... 202010084767.2

(51) Int. Cl.
*G06F 1/26* (2006.01)
(52) U.S. Cl.
CPC ..................................... *G06F 1/26* (2013.01)
(58) Field of Classification Search
None
See application file for complete search history.

(56) References Cited

U.S. PATENT DOCUMENTS 9,986,658 B2    5/2018  Sarti
2002/0166073 A1*  11/2002  Nguyen ................... G06F 1/26
                                                        713/300

(Continued)

FOREIGN PATENT DOCUMENTS

CN          1979458 A       6/2007
CN        102053939 A       5/2011

(Continued)

OTHER PUBLICATIONS

International Search Report of corresponding PCT application PCT/CN2020/098378, mailed Nov. 17, 2020, 5 pages.

(Continued)

*Primary Examiner* — Danny Chan
(74) *Attorney, Agent, or Firm* — Cooper Legal Group LLC (57) ABSTRACT

A control device for centralized power supply of a server includes a depth detection module provided on a centralized power supply board of a cabinet, and a signal transmission circuit. The depth detection module outputs a first state signal to enable the signal transmission circuit to output a disable signal when a power clamp of a server is not completely connected to a power output end, so as to prevent a hot-swap control module from being started. The depth detection module outputs a second state signal to enable the signal transmission circuit to output an enable signal when the power clamp is completely connected to the power output end, so as to start the hot-swap control module. Thus, the hot-swap control module cannot be powered on when the power clamp of the server is not in complete contact with the power output end of the centralized power supply board.

9 Claims, 2 Drawing Sheets

(56) References Cited

U.S. PATENT DOCUMENTS

| | | | |
|---|---|---|---|
| 2007/0204088 A1 | 8/2007 | Chen | |
| 2010/0013323 A1* | 1/2010 | Chung | H02H 11/005 307/125 |
| 2010/0045357 A1* | 2/2010 | Chen | H02H 9/004 327/309 |
| 2012/0293903 A1* | 11/2012 | Liao | H02H 9/004 361/93.9 |
| 2017/0164505 A1 | 6/2017 | Sarti | |
| 2019/0138071 A1* | 5/2019 | Liao | G06F 1/266 |
| 2019/0286601 A1* | 9/2019 | Delany | H02H 9/025 |

FOREIGN PATENT DOCUMENTS

| | | |
|---|---|---|
| CN | 102735882 A | 10/2012 |
| CN | 104391557 A | 3/2015 |
| CN | 107102709 A | 8/2017 |
| CN | 108323128 A | 7/2018 |
| CN | 110649694 A | 1/2020 |
| CN | 111258403 A | 6/2020 |

OTHER PUBLICATIONS

Written Opinion of corresponding PCT application PCT/CN2020/098378, mailed Nov. 17, 2020, 9 pages.
First Office Action cited in CN202010084767.2, mailed Feb. 19, 2021, 9 pages.

* cited by examiner

CONTROL DEVICE FOR CENTRALIZED POWER SUPPLY OF SERVER

The present application claims priority to Chinese Patent Application No. 202010084767.2, filed to the China Patent Office on Feb. 10, 2020, entitled "Control Device for Centralized Power Supply of Server", the entire contents of which are incorporated herein by reference.

FIELD

The present application relates to the technical field of power supply of servers, and in particular, to a control device for centralized power supply of a server.

BACKGROUND

In today's era of explosive growth of data and computing power, the number of servers in a machine room has increased dramatically. The current way of centralized power supply of servers is becoming gradually popular, since independent power supply of each server would result in a great waste of resources.

Figure 1:
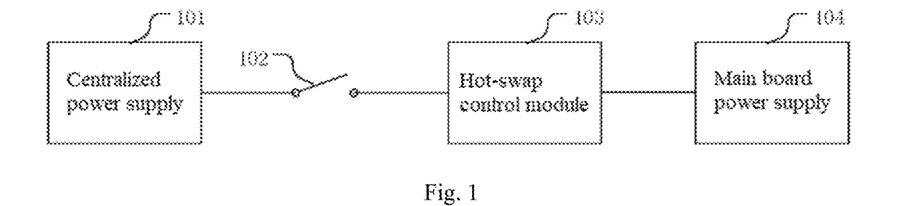
FIG. 1 is a centralized power supply circuit of a server in the prior art.

FIG. 1 is a centralized power supply circuit of a server in the prior art. As shown in FIG. 1, a centralized power supply 101 of a cabinet provides a voltage of 12 V. When a single server is connected to the cabinet, after a power clamp 102 of the server is completely connected to a power output end of the centralized power supply 101, a power of 12 V is output to a main board of the server. A hot-swap control module 103 at the foremost end of the main board of the server controls the power of 12 V to be slowly input into a main board power supply 104, so as to ensure that a large surge current does not occur, thus supplying power to the entire main board through the main board power supply 104.

However, when the server is plugged into the cabinet to power on, if the power clamp 102 of the server is not in complete contact with the power output end of the centralized power supply 101 and the hot-swap control module 103 of the server immediately starts to power on, due to incomplete contact, a large contact impedance and thus a heating phenomenon are likely to occur at the moment, resulting in that server components and cabinet components are damaged, and there is also a certain potential safety hazard.

It is a technical problem to be solved by a person skilled in the art how to reduce the damage to components in the power-on process of a server so as to ensure that the server can be safely powered on during hot-swap.

SUMMARY

An object of the present application is to provide a control device for centralized power supply of a server, which is used to reduce the damage to components in the power-on process of the server and ensure that the server is safely powered on during hot-swap.

In order to solve the above technical problem, the present application provides a control device for centralized power supply of a server, including: a depth detection module provided on a centralized power supply board of a cabinet, and a signal transmission circuit.

A signal output end of the depth detection module, a power output end of the centralized power supply board, and a first end of the signal transmission circuit are connected, while a second end of the signal transmission circuit is connected to an enable end of a hot-swap control module of a main board of the server.

The depth detection module is configured to output a first state signal to enable the signal transmission circuit to output a disable signal in response to a power clamp of the server being not completely connected to the power output end, so as to prevent the hot-swap control module from being started.

The depth detection module is further configured to output a second state signal to enable the signal transmission circuit to output an enable signal in response to the power clamp being completely connected to the power output end, so as to start the hot-swap control module.

Optionally, the depth detection module includes a travel switch provided at the power output end.

The travel switch is in a switch-on state in response to the power clamp being not completely connected to the power output end, and the depth detection module outputs a low level; or the travel switch is in a switch-off state in response to the power clamp being completely connected to the power output end, and the depth detection module outputs a high level.

Optionally, the control device further includes a controller provided on the main board.

The signal transmission circuit includes an isolating resistor and a first field effect transistor accordingly.

A power input end of the controller is connected to a power output end of the hot-swap control module; a signal receiving end of the controller is connected to the signal output end of the depth detection module; a signal output end of the controller is connected to a gate of the first field effect transistor; a first end of the isolating resistor is connected to the signal output end of the depth detection module; a second end of the isolating resistor, a drain of the first field effect transistor and the enable end of the hot-swap control module are connected; and a source of the first field effect transistor is grounded.

The controller is configured to output a high level to turn on the first field effect transistor in response to a receipt of the second state signal, and output an enable signal to the enable end of the hot-swap control module through the first field effect transistor.

The controller is further configured to control the main board to execute a shutdown time in response to an output signal of the depth detection module being changed from the second state signal to the first state signal, and output a low level to turn off the first field effect transistor after executing the shutdown time, whereby the hot-swap control module is turned off under the control of the first state signal.

Optionally, the controller is specifically a CPLD.

Optionally, the signal transmission circuit further includes a first divider resistor and a second divider resistor.

A first end of the first divider resistor is connected to the power output end; a second end of the first divider resistor, a first end of the second divider resistor, the signal receiving end of the controller and the first end of the isolating resistor are connected; and a second end of the second divider resistor is grounded.

Optionally, the signal transmission circuit further includes a second field effect transistor and a third field effect transistor.

A gate of the second field effect transistor is connected to the signal output end of the depth detection module; a drain of the second field effect transistor is connected to the power output end; a source of the second field effect transistor is grounded; a gate of the third field effect transistor is connected to the second end of the isolating resistor; a drain of the third field effect transistor is connected to the enable end of the hot-swap control module; and a source of the third field effect transistor is grounded.

Optionally, the first state signal is at a low level, and the second state signal is at a high level.

The first field effect transistor, the second field effect transistor and the third field effect transistor are all inverters accordingly.

Optionally, the signal transmission circuit further includes a third divider resistor provided between the power output end and the drain of the second field effect transistor.

Optionally, the signal transmission circuit further includes a fourth divider resistor and a fifth divider resistor.

A first end of the fourth divider resistor is connected to the power output end; a second end of the fourth divider resistor, a first end of the fifth divider resistor, the drain of the third field effect transistor and the enable end of the hot-swap control module are connected; and a second end of the fifth divider resistor is grounded.

Optionally, the control device further includes a sixth divider resistor provided between the power output end and a power supply end of the depth detection module.

The control device for centralized power supply of the server provided by the present application includes a depth detection module provided on a centralized power supply board of a cabinet, and a signal transmission circuit. A signal output end of the depth detection module, a power output end of the centralized power supply board, and a first end of the signal transmission circuit are connected, while a second end of the signal transmission circuit is connected to an enable end of a hot-swap control module of a main board of the server. The depth detection module outputs a first state signal to enable the signal transmission circuit to output a disable signal when a power clamp of the server is not completely connected to the power output end, so as to prevent the hot-swap control module from being started. The depth detection module outputs a second state signal to enable the signal transmission circuit to output an enable signal when the power clamp is completely connected to the power output end, so as to start the hot-swap control module. The depth detection module outputs a state signal to control the signal transmission circuit to transfer an enable signal to the hot-swap control module. The hot-swap control module cannot be powered on when the power clamp of the server is not in complete contact with the power output end of the centralized power supply board. The server can be powered on only after the power clamp is in complete contact with the power output end, such that the damage to components in the power-on process of the server is reduced, and the server can be safely powered on during hot-swap.

BRIEF DESCRIPTION OF THE DRAWINGS

In order to more clearly illustrate the technical solutions in the embodiments of the present application or the prior art, the drawings needing to be used in the description of the embodiments or the prior art will be briefly introduced below. Obviously, the drawings in the following description are merely some embodiments of the present application. A person ordinarily skilled in the art may also obtain other drawings according to these drawings without involving any inventive effort.

DETAILED DESCRIPTION OF THE EMBODIMENTS

The core of the present application is to provide a control device for centralized power supply of a server, which is used to reduce the damage to components in the power-on process of the server and ensure that the server is safely powered on during hot-swap.

The technical solutions in the embodiments of the present application will be clearly and completely described below in combination with the drawings in the embodiments of the present application. Obviously, the described embodiments are only a few, but not all embodiments of the present application. All other embodiments obtained by a person ordinarily skilled in the art based on the embodiments in the present application without involving inventive efforts should fall within the scope of protection of the present application.

Figure 2:
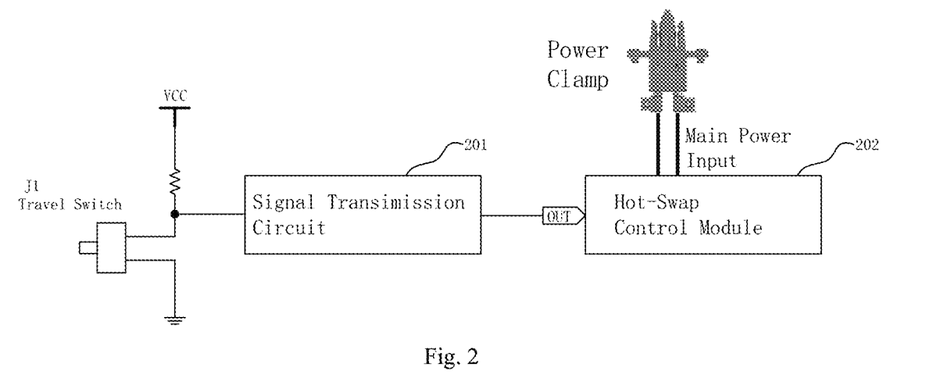
FIG. 2 is a schematic structural diagram of a control device for centralized power supply of a server according to an embodiment of the present application.

FIG. 2 is a schematic structural diagram of a control device for centralized power supply of a server according to an embodiment of the present application.

As shown in FIG. 2, a control device for centralized power supply of the server according to an embodiment of the present application includes a depth detection module J1 provided on a centralized power supply board of a cabinet, and a signal transmission circuit 201.

A signal output end of the depth detection module J1, a power output end of the centralized power supply board, and a first end of the signal transmission circuit 201 are connected. A second end of the signal transmission circuit 201 is connected to an enable end of a hot-swap control module 202 of a main board of the server.

The depth detection module J1 is configured to output a first state signal to enable the signal transmission circuit 201 to output a disable signal when a power clamp of the server is not completely connected to the power output end, so as to prevent the hot-swap control module 202 from being started.

The depth detection module J1 is further configured to output a second state signal to enable the signal transmission circuit 201 to output an enable signal when the power clamp is completely connected to the power output end, so as to start the hot-swap control module 202.

In specific implementations, the depth detection module J1 is provided on the centralized power supply board of the cabinet to detect a contact distance between the power clamp of the server and the power output end of the centralized power supply board, thereby judging whether the power clamp is completely connected to the power output end. The signal transmission circuit 201 may be provided on the main board of the server and connected to a front end of the hot-swap control module 202. The depth detection module J1 enables the signal transmission circuit 201 to output high and low levels by outputting different state signals, so as to control a switch-on/-off state of the hot-swap control module 202. In practical applications, the enable signal to the hot-swap control module 202 may be at a high level, and accordingly, the disable signal is at a low level.

A depth detection function may be realized by the depth detection module J1 through an external travel switch of the centralized power supply board. As such, the depth detection module J1 includes a travel switch provided at the power output end.

The travel switch is in a switch-on state when the power clamp is not completely connected to the power output end, and the depth detection module J1 outputs a low level. The travel switch is in a switch-off state when the power clamp is completely connected to the power output end, and the depth detection module J1 outputs a high level.

As shown in FIG. 2, a first end of the depth detection module J1 is grounded. The signal output end of the depth detection module J1 is connected to a power of 3.3 V. The signal output end of the depth detection module J1 is connected to a power supply end of the depth detection module J1. The control device for centralized power supply of the server according to an embodiment of the present application further includes a sixth divider resistor R1 provided between the power output end and the power supply end of the depth detection module J1. The sixth divider resistor R1 may have a resistance of 4.7 kΩ.

The control device for centralized power supply of the server according to an embodiment of the present application includes a depth detection module provided on a centralized power supply board of a cabinet, and a signal transmission circuit. A signal output end of the depth detection module, a power output end of the centralized power supply board, and a first end of the signal transmission circuit are connected, while a second end of the signal transmission circuit is connected to an enable end of a hot-swap control module of a main board of the server. The depth detection module outputs a first state signal to enable the signal transmission circuit to output a disable signal when a power clamp of the server is not completely connected to the power output end, so as to prevent the hot-swap control module from being started. The depth detection module outputs a second state signal to enable the signal transmission circuit to output an enable signal when the power clamp is completely connected to the power output end, so as to start the hot-swap control module. The depth detection module outputs a state signal to control the signal transmission circuit to transfer an enable signal to the hot-swap control module. The hot-swap control module cannot be powered on when the power clamp of the server is not in complete contact with the power output end of the centralized power supply board. The server can be powered on only after the power clamp is in complete contact with the power output end, such that the damage to components in the power-on process of the server is reduced, and the server can be safely powered on during hot-swap.

Figure 3:
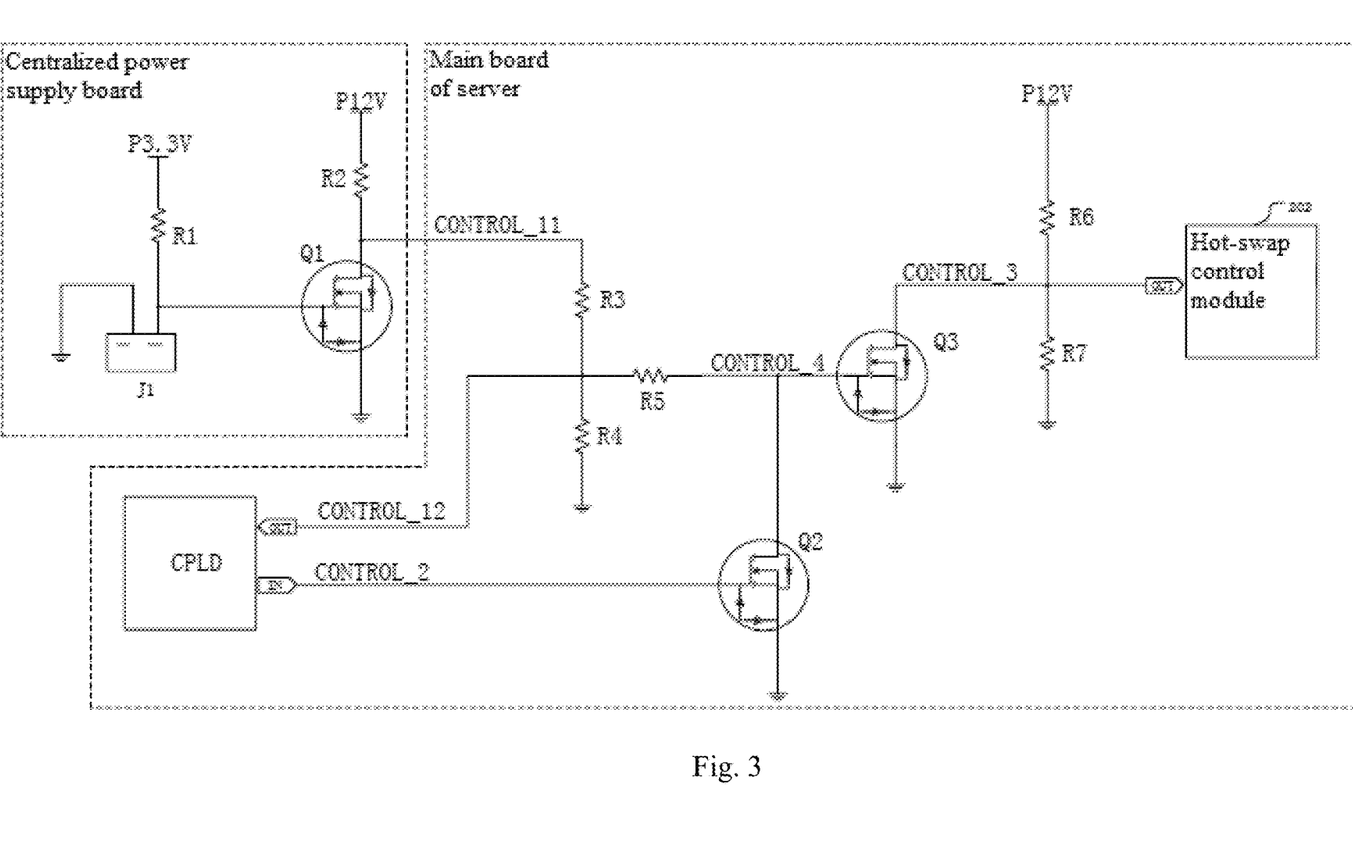
FIG. 3 is a schematic structural diagram of another control device for centralized power supply of a server according to an embodiment of the present application.

FIG. 3 is a schematic structural diagram of another control device for centralized power supply of a server according to an embodiment of the present application.

In practical application, when the server is powered off, since the shutdown process of the server is relatively complicated, an operator often unplugs a power clamp of the server without shutting down the server. When the power clamp is disconnected from a power output end, a main board of the server will suddenly be powered off. At this moment, there is also a problem that components of the server and components of a centralized power supply board will be damaged. According to the control device for centralized power supply of the server provided by the above embodiment, when the server is powered on by the centralized power supply of the server, the hot-swap control module 202 can be prevented from being started when the power clamp of the server and the power output end of the centralized power supply board are not completely connected. When the server is powered off, the depth detection module J1 outputs a first state signal in the process of gradually disconnecting the power clamp from the power output end, the hot-swap control module 202 is turned off, and there may also be a case where the main board of the server is suddenly powered down.

In order to solve this problem, an embodiment of the present application adds a priority control mechanism on the basis of the above embodiment, that is, the main board of the server is shut down and then powered off in the power-off process of the server through the control mechanism. The control mechanism needs to be realized by a controller. When the controller is not powered on, the hot-swap control module 202 is controlled by an output signal of the depth detection module J1. After the controller is powered on, the controller controls the hot-swap control module 202. When the server is powered on, the output signal of the depth detection module J1 enables the controller which in turn takes over the control right of the hot-swap control module 202. When the server is powered off, the output signal of the depth detection module J1 informs the controller that the server is about to power off, and the controller controls the main board of the server to power off after executing a shutdown time, and returns the control right to the output signal of the depth detection module J1, so as to complete the entire power-off process.

As such, as shown in FIG. 3, on the basis of the above embodiment, the control device for centralized power supply of the server according to an embodiment of the present application further includes a controller provided on the main board.

The signal transmission circuit 201 includes an isolating resistor R5 and a first field effect transistor Q2 accordingly.

A power input end of the controller is connected to a power output end of the hot-swap control module 202. A signal receiving end of the controller is connected to the signal output end of the depth detection module J1. A signal output end of the controller is connected to a gate of the first field effect transistor Q2. A first end of the isolating resistor R5 is connected to the signal output end of the depth detection module J1. A second end of the isolating resistor R5, a drain of the first field effect transistor Q2 and an enable end of the hot-swap control module 202 are connected. A source of the first field effect transistor Q2 is grounded.

The controller is configured to output a high level to turn on the first field effect transistor Q2 when receiving the second state signal, and output an enable signal to the enable end of the hot-swap control module 202 through the first field effect transistor Q2.

The controller is further configured to control the main board to execute the shutdown time when the output signal of the depth detection module J1 is changed from the second state signal to the first state signal, and output a low level to turn off the first field effect transistor Q2 after executing the shutdown time, such that the hot-swap control module 202 is turned off under the control of the first state signal.

In specific implementations, the controller may be an inherent controller on the main board of the server or another controller. As a preferred implementation, the controller is a CPLD on the main board of the server.

The isolating resistor R5 serves to isolate the output signal of the depth detection module J1 after the controller is powered on. Therefore, a resistor with a large resistance value should be selected.

When the server is powered on, the hot-swap control module 202 is started after receiving the second state signal output by the depth detection module J1, the main board of the server and then the CPLD are powered on. When the second state signal is received by a signal receiving end of the CPLD, the CPLD outputs a high level to enable the first field effect transistor Q2 to be turned on. At this moment, due to the existence of the isolating resistor R5, the influence of the output signal of the depth detection module J1 on the hot-swap control module 202 is isolated, and a high-level signal is transmitted to the hot-swap control module 202 to start the hot-swap control module 202. When the server is powered off, the CPLD controls the main board to execute the shutdown time when receiving the first state signal output by the depth detection module J1, and then outputs a low level to turn off the first field effect transistor Q2. The hot-swap control module 202 is turned off under the control of the first state signal, the main board of the server and then the CPLD are powered off.

Since a power supply of the CPLD usually has a voltage of about 3.3 V and an output voltage of the centralized power supply board connected to the signal output end of the depth detection module J1 is 12 V, the signal output end of the depth detection module J1 cannot be directly connected to the CPLD. A voltage divider circuit needs to be provided between the signal output end of the depth detection module J1 and the signal receiving end of the CPLD. The voltage divider circuit may be provided at the signal output end of the depth detection module J1 on the centralized power supply board, so as to directly make the output of the depth detection module J1 comply with a valid signal pre-agreed with the CPLD.

It is noted that the power supply mode of the server mainly includes two modes: a centralized power supply mode and a PSU power supply mode. The centralized power supply mode is to retrofit a PSU power supply into a centralized power supply and provide a voltage of 12 V, so as to supply power for a plurality of servers. The PSU power supply mode is to directly install a PSU power supply on the server. PSU power supplies currently available mainly comprise a PSU power supply of an M5 platform and of an M6 platform. The PSU power supply of the M6 platform is commonly used, but the PSU power supply of the M5 platform is adopted in uncommon cases.

Since the PSU power supply of the M6 platform has an idle pin B21, the pin is used as a pin for outputting the output signal of the depth detection module J1 in order to facilitate the implementation of the scheme. However, the pin B21 corresponds to the PSU power supply of the M5 platform being a power supply of 12 V. When the PSU power supply of the M5 platform is adopted, the power supply of 12 V will be directly connected to the CPLD, causing the CPLD to burn out. In order to be compatible with the PSU power supply of the M5 platform and the PSU power supply of the M6 platform, the output signal of the depth detection module J1 needs to be adjusted to a voltage level of 12 V, and a signal entering the CPLD is subjected to step-down processing to obtain a voltage of about 3.3 V.

To this end, the signal transmission circuit 201 further includes a first divider resistor R3 and a second divider resistor R4 on the main board of the server.

A first end of the first divider resistor R3 is connected to the power output end. A second end of the first divider resistor R3, a first end of the second divider resistor R4, the signal receiving end of the controller CPLD and the first end of the isolating resistor R5 are connected. A second end of the second divider resistor R4 is grounded. The first divider resistor R3 may have a resistance of 100 kΩ, and the second divider resistor R4 may have a resistance of 41.2 kΩ.

On the basis that the first divider resistor R3 has a resistance of 100 kΩ and the second divider resistor R4 has a resistance of 41.2 kΩ, the isolating resistor R5 may have a resistance of 365 kΩ.

In order to further improve circuit security, as shown in FIG. 3, the signal transmission circuit 201 further includes a second field effect transistor Q1 and a third field effect transistor Q3.

A gate of the second field effect transistor Q1 is connected to the signal output end of the depth detection module J1. A drain of the second field effect transistor Q1 is connected to the power output end. A source of the second field effect transistor Q1 is grounded. A gate of the third field effect transistor Q3 is connected to the second end of the isolating resistor R5. A drain of the third field effect transistor Q3 is connected to the enable end of the hot-swap control module 202. A source of the third field effect transistor Q3 is grounded.

Further, in order to regulate the output voltage, the signal transmission circuit 201 further includes a third divider resistor R2 provided between the power output end and the drain of the second field effect transistor Q1. The third divider resistor R2 may have a resistance of 10 kΩ.

It is mentioned above that in order to be compatible with the PSU power supply of the M5 platform and the PSU power supply of the M6 platform, the output signal of the depth detection module J1 needs to be adjusted to a voltage level of 12 V, and a signal entering the CPLD is subjected to step-down processing to obtain a voltage of about 3.3 V. However, when the server adopts PSU power supply rather than centralized power supply, since the PSU power supply is directly connected to the server, it is not necessary to use the CPLD to perform the above shutdown operation in the power-off process again.

In order to prevent the PSU power supply from being misidentified as a centralized power supply board by the CPLD of the main board of the server when the server adopts the PSU power supply mode, as a preferred implementation, a low-level valid control signal of the CPLD is adopted, i.e. the first state signal is set to be at a low level, and a second state signal is set to be at a high level.

Accordingly, since the enable signal of the hot-swap control module 202 is usually at a high level and the field effect transistor also needs to be turned on at a high level, the first field effect transistor Q2, the second field effect transistor Q1 and the third field effect transistor Q3 all are in the form of inverter, specifically inverters in the type of NX7002AK.

Further, in order to regulate the output voltage to a level required by the hot-swap control module 202, the signal transmission circuit 201 further includes a fourth divider resistor R6 and a fifth divider resistor R7.

A first end of the fourth divider resistor R6 is connected to the power output end. A second end of the fourth divider resistor R6, a first end of the fifth divider resistor R7, the drain of the third field effect transistor and the enable end of the hot-swap control module 202 are connected. A second end of the fifth divider resistor R7 is grounded. The fourth divider resistor R6 may have a resistance of 41.2 kΩ, and the fifth divider resistor R7 may have a resistance of 10 kΩ.

Based on the control device for centralized power supply of the server provided in the above embodiment, signal states of the control device for centralized power supply of the server in the power-on and power-off processes of the server are described below in conjunction with Table 1.

TABLE 1

Power-on and Power-off Signal States of Control Device for Centralized Power Supply of Server According to Embodiment of Present Application

| | Server state | J1 | P12 V | CONTROL_11 | CONTROL_12 | CONTROL_4 | CONTROL_3 | Hot-swap control module | CPLD | CONTROL_2 |
|---|---|---|---|---|---|---|---|---|---|---|
| 1 | Before being plugged into cabinet | On | 0 V | | | Power-off not working | | | | |
| 2 | Plugged into cabinet: not complete contact | On | 12 V | High level | High level | High level | Low level | Off | Not working | Low level |
| 3 | Plugged into cabinet: complete contact | Off | 12 V | Low level | Low level | Low level | High level | On | Working | High level |
| 4 | Unplugged from cabinet: not completely unplugged | On | 12 V | High level | High level | Low level (controlled by CONTROL_12) | High level | On | Working (start to execute shutdown time) | High level |
| 5 | | | | | | | | | Completion of shutdown time | Low level |
| 6 | | | | | | High level | Low level | Off | Not working | Low level |
| 7 | Unplugged from cabinet: completely unplugged | On | 0 V | | | Power-off not working | | | | |

Server State I (No. 1)

Before the server is plugged into the cabinet, the power clamp of the server is out of contact with the power output end of the centralized power supply board at this moment. The travel switch in the depth detection module J1 is turned on. An input power of P12V connected to the main board of the server is 0 V. The entire main board of the server is in a power-off non-working state.

Server State II (No. 2)

When the server starts to be plugged into the cabinet, the power clamp is in, but not complete, contact with the power output end. The travel switch in the depth detection module J1 is still in a switch-on state, and parts of two dotted line blocks shown in FIG. 3 are connected. An input power of 12V connected to the main board of the server starts to be powered on. After passing through the inverter Q1, a control signal CONTROL_11 is at a high level, a control signal CONTROL_12 is at a high level, and a control signal CONTROL_4 is at a high level. After passing through the inverter Q3, a control signal CONTROL_3 is at a low level. The hot-swap control module 202 receives a disable signal and is not started. The CPLD is preset to be valid at a low level. Therefore, the module is not started to work under the action of the control signal CONTROL_12, and then a control signal CONTROL_2 is at a low level.

Server State III (No. 3)

When the server is plugged into the cabinet and the power clamp is in complete contact with the power output end, the travel switch in the depth detection module J1 is turned off, and a high level is output. After passing through the inverter Q1, a control signal CONTROL_11 outputs a low level, and then a control signal CONTROL_4 is at a low level. After passing through the inverter Q3, a control signal CONTROL_3 is at a high level, such that the hot-swap control module 202 is started, the main board of the server is powered on, and the CPLD starts to work.

A control signal CONTROL_12 is consistent with the control signal CONTROL_11 at a low level. The CPLD recognizes a low-level valid signal, and outputs a control signal CONTROL_2 at a high level, such that the inverter Q2 is turned on. Under the action of the isolating resistor R5, the control right of the control signal CONTROL_4 is transferred to the CPLD. After the control signal CONTROL_2 passes through the inverter Q2, CONTROL_4 is at a level. After passing through the inverter Q3, the control signal CONTROL_3 is still at a high level. The hot-swap control module 202 remains in a switch-on state. The entire main board of the server is powered on smoothly.

Server State IV (No. 4, 5, 6)

When the server is unplugged from the cabinet and the power clamp is not completely disconnected from the power output end, the travel switch in the depth detection module J1 is turned on again, and a low level is output. After passing through the inverter Q1, a control signal CONTROL_11 outputs a high level. A control signal CONTROL_12 is consistent with the control signal CONTROL_11 at a high level. When a CPLD receiving signal is converted from a low level to a high level, the shutdown time of the main board of the server is started to enable other components on the main board of the server to be shut down. When the shutdown time is not completed, a control signal CONTROL_2 output by the CPLD is still at a high level, and the hot-swap control module 202 remains in a switch-on state.

After the CPLD completes the shutdown time of the main board of the server, the output control signal CONTROL_2 is switched to a low level, the inverter Q2 is turned off, and then the control signal CONTROL_4 is switched to a high level under the action of the control signal CONTROL_11. After passing through the inverter Q3, the control signal CONTROL_3 is at a low level, and the hot-swap control module 202 is turned off, such that the main board of the server and then the CPLD are powered off.

Server State V (No. 7)

After the server is completely unplugged from the cabinet, the power clamp is completely disconnected from the power output end. The travel switch in the depth detection module J1 is still in a switch-on state. A power of P12V connected to the main board of the server becomes 0 V. The entire main board of the server is in a power-off non-working state.

Based on the above description, it can be seen that the control device for centralized power supply of the server according to an embodiment of the present application detects a contact state between the power clamp of the server and the power output end of the centralized power supply board through the depth detection module J1, so as to ensure that the main board of the server is powered on only after the server is completely plugged into the cabinet. Then, the controller works to perform priority control on the control signal CONTROL_3 through the inverter Q2, so as to ensure that the server is powered off only after the server is shut down, thus solving the problems of heating and loss of components of the server and of the centralized power supply board in the power-on process and the power-off process in the mode of centralized power supply of the server, and prolonging the lifetime of the components of the server and of the centralized power supply board.

Further, the PSU power supply of the M5 platform may be compatible by adopting a voltage of 12 V for a communication signal between the centralized power supply board and the main board of the server.

With the design of a low-level valid control signal input to the controller, the control device for centralized power supply of the server according to an embodiment of the present application may be compatible with a PSU power supply in a PSU power supply mode. The above control over the power-on and power-off processes of the server can be realized directly through a control signal in a centralized power supply mode. Since it is not necessary to execute the shutdown time in the PSU power supply mode, the controller will not misidentify a PSU power supply in an M5 platform as a centralized power supply board.

However, the arrangement of the divider resistors and the isolating resistor R5 can ensure that each element in the circuit is provided with a reasonable power supply voltage, which is convenient for practical application of the scheme.

The control device for centralized power supply of the server according to the present application has been described in detail above. Various embodiments are described in the description in a progressive manner. Each embodiment focuses on differences from the other embodiments. The same or similar parts of the various embodiments may be referred to each other. It should be noted that a person ordinarily skilled in the art may make numerous improvements and modifications to the present application without departing from the principles of the present application. Such improvements and modifications are intended to be within the scope of the appended claims of the present application.

It should also be noted that relational terms such as first and second in the present description are used solely to distinguish one entity or operation from another without necessarily requiring or implying any actual relationship or order between such entities or operations. Moreover, the terms "include", "contain", or any other variations thereof are intended to cover a non-exclusive inclusion, such that a process, method, article, or device including a series of elements not only includes those elements, but also includes other elements that are not explicitly listed, or also includes elements inherent to such process, method, article, or device. It is not excluded, without more constraints, that additional identical elements exist in the process, method, article, or device including elements defined by a sentence "including a . . . ".

The invention claimed is:

1. A control device for a centralized power supply of a server, comprising: a depth detection module provided on a centralized power supply board of a cabinet, and a signal transmission circuit, and a controller,
wherein a signal output end of the depth detection module, a power output end of the centralized power supply board, and a first end of the signal transmission circuit are connected, and a second end of the signal transmission circuit is connected to an enable end of a hot-swap control module of a main board of the server;
the depth detection module is configured to output a first state signal to enable the signal transmission circuit to output a disable signal in response to a power clamp of the server being not completely connected to the power output end of the centralized power supply board, so as to prevent the hot-swap control module from being started;
the depth detection module is further configured to output a second state signal to enable the signal transmission circuit to output an enable signal in response to the power clamp being completely connected to the power output end of the centralized power supply board, so as to start the hot-swap control module;
the controller is provided on the main board;
the signal transmission circuit comprises an isolating resistor and a first field effect transistor;
a power input end of the controller is connected to a power output end of the hot-swap control module, a signal receiving end of the controller is connected to the signal output end of the depth detection module, a signal output end of the controller is connected to a gate of the first field effect transistor, a first end of the isolating resistor is connected to the signal output end of the depth detection module, a second end of the isolating resistor, a drain of the first field effect transistor and the enable end of the hot-swap control module are connected, and a source of the first field effect transistor is grounded;
the controller is configured to output a high level to turn on the first field effect transistor in response to a receipt of the second state signal, and output a second enable signal to the enable end of the hot-swap control module through the first field effect transistor; and
the controller is further configured to control the main board to execute a shutdown time in response to an output signal of the depth detection module being changed from the second state signal to the first state signal, and output a low level to turn off the first field effect transistor after executing the shutdown time, whereby the hot-swap control module is turned off under control of the first state signal.

2. The control device according to claim 1, wherein the depth detection module comprises a travel switch provided at the power output end of the centralized power supply board;
the travel switch is in a switch-on state in response to the power clamp being not completely connected to the power output end of the centralized power supply board, and the depth detection module outputs a low level; or the travel switch is in a switch-off state in response to the power clamp being completely connected to the power output end of the centralized power supply board, and the depth detection module outputs a high level.

3. The control device according to claim 1, wherein the controller is specifically a Complex Programmable Logic Device (CPLD).

4. The control device according to claim 1, wherein the signal transmission circuit further comprises a first divider resistor and a second divider resistor;
    a first end of the first divider resistor is connected to the power output end of the centralized power supply board, a second end of the first divider resistor, a first end of the second divider resistor, the signal receiving end of the controller and the first end of the isolating resistor are connected, and a second end of the second divider resistor is grounded.

5. The control device according to claim 1, wherein the signal transmission circuit further comprises a second field effect transistor and a third field effect transistor;
    a gate of the second field effect transistor is connected to the signal output end of the depth detection module, a drain of the second field effect transistor is connected to the power output end of the centralized power supply board, a source of the second field effect transistor is grounded; a gate of the third field effect transistor is connected to the second end of the isolating resistor, a drain of the third field effect transistor is connected to the enable end of the hot-swap control module, and a source of the third field effect transistor is grounded.

6. The control device according to claim 5, wherein when the first state signal is at a low level and the second state signal is at a high level, the first field effect transistor, the second field effect transistor and the third field effect transistor are all inverters.

7. The control device according to claim 5, wherein the signal transmission circuit further comprises a third divider resistor provided between the power output end of the centralized power supply board and the drain of the second field effect transistor.

8. The control device according to claim 5, wherein the signal transmission circuit further comprises a fourth divider resistor and a fifth divider resistor;
    a first end of the fourth divider resistor is connected to the power output end of the hot-swap control module, a second end of the fourth divider resistor, a first end of the fifth divider resistor, the drain of the third field effect transistor and the enable end of the hot-swap control module are connected, and a second end of the fifth divider resistor is grounded.

9. The control device according to claim 1, further comprising: a sixth divider resistor provided between the power output end of the centralized power supply board and a power supply end of the depth detection module.

\* \* \* \* \*